United States Patent
Li

(10) Patent No.: US 11,902,990 B2
(45) Date of Patent: Feb. 13, 2024

(54) DATA TRANSMISSION METHOD, BASE STATION, USER EQUIPMENT AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 390 days.

(21) Appl. No.: 17/418,756

(22) PCT Filed: Dec. 25, 2018

(86) PCT No.: PCT/CN2018/123579
§ 371 (c)(1),
(2) Date: Jun. 25, 2021

(87) PCT Pub. No.: WO2020/132885
PCT Pub. Date: Jul. 2, 2020

(65) Prior Publication Data
US 2022/0078766 A1     Mar. 10, 2022

(51) Int. Cl.
*H04W 72/23* (2023.01)
*H04W 72/044* (2023.01)

(52) U.S. Cl.
CPC ......... *H04W 72/23* (2023.01); *H04W 72/046* (2013.01)

(58) Field of Classification Search
CPC ........................... H04W 72/046; H04W 72/23
USPC ........................... 370/329, 400, 403
See application file for complete search history.

(56) References Cited

U.S. PATENT DOCUMENTS

| 2013/0072243 | A1 | 3/2013 | Yu |
| 2013/0223251 | A1 | 8/2013 | Li et al. |
| 2018/0343653 | A1 | 11/2018 | Guo |
| 2020/0107327 | A1 | 4/2020 | Wang et al. |

(Continued)

FOREIGN PATENT DOCUMENTS

| CN | 103918196 A | 7/2014 |
| CN | 108092754 A | 5/2018 |

(Continued)

OTHER PUBLICATIONS

Notice of Allowance of the Russian application No. 2021121535, dated Apr. 14, 2022.

(Continued)

*Primary Examiner* — Dang T Ton
(74) *Attorney, Agent, or Firm* — Arch & Lake LLP

(57) ABSTRACT

A method, apparatus, and a storage medium for data transmission are provided. The method may be applied to a base station. The base station may generate signaling used to indicate at least two receive beams of user equipment. The signaling may include TCI states of multiple TBs. The multiple TBs may be sent by at least two panels. The at least two panels may be different panels from the same TRP or panels from different TRPs. The multiple TBs may correspond to the at least two receive beams of the user equipment. The base station may also transmit the signaling to the user equipment, such that the user equipment may determine a respective receiving beam for receiving each of the plurality of TBs according to the signaling and may receive the TB through the determined respective receiving beam.

18 Claims, 9 Drawing Sheets

(56) References Cited

U.S. PATENT DOCUMENTS

| | | | |
|---|---|---|---|
| 2020/0228267 A1 | 7/2020 | Park et al. | |
| 2021/0351892 A1 | 11/2021 | Park et al. | |
| 2023/0254088 A1* | 8/2023 | Ly | H04L 5/0053 370/329 |

FOREIGN PATENT DOCUMENTS

| | | | |
|---|---|---|---|
| CN | 110663282 A | 1/2020 | |
| KR | 20200003935 A | 1/2020 | |
| RU | 2653232 C2 | 5/2018 | |
| WO | 2018062937 A1 | 4/2018 | |
| WO | 2018217063 A1 | 11/2018 | |
| WO | 2018232090 A1 | 12/2018 | |
| WO | 2018232294 A1 | 12/2018 | |

OTHER PUBLICATIONS

English translation of the Written Opinion of the International Search Authority in the international application No. PCT/CN2018/123579, dated Aug. 27, 2019, (3p).
First Office Action of the Chinese Application No. 201880002595.0, dated May 26, 2021, (14p).
Lenovo, "Discussion of multi-beam operation" 3GPP TSG RAN WG1 Meeting #95 R1-1812785, Nov. 12-16, 2018, (5p).
ZTE, "Discussion on beam management" 3GPP TSG RAN WG1 Meeting #90-bis R1-1717424, Oct. 9-13, 2017, (12p).
Sony, "Considerations on multi-beam operation" 3GPP TSG-RAN WG1 #94bis R1-1810644, Oct. 8-12, 2018, (5p).
Huawei, "Enhancements on multi-TRP/panel transmission" 3GPP TSG RAN WG1 Meeting #95 R1-1812243, Nov. 12-16, 2018, (9p).
Mediatek Inc, "Enhancements on multi-beam operations" 3GPP TSG RAN WG1 Meeting #95 R1-1812350, Nov. 12-16, 2018, (9p).
3GPP TS 38.214 V16.7.0 (Sep. 2021), 3rd Generation Partnership Project; Technical Specification Group Radio Access Network; NR; Physical layer procedures for data, (Release 16), (171p).
International Search Report of PCT Application No. PCT/CN2018/123579 dated Aug. 27, 2019 with English translation (4p).
CATT, "Consideration on Beam Management", 3GPP TSG RAN WG1, Meeting 93bis R1-1717812, Oct. 13, 2017, (10p).
Qualcomm Inc., "Beam Management for NR", 3GPP TSG-RAN WG1, Meeting 93, R1-1807341, May 25, 2018, (11p).
NTT Docomo, "Details on Beam Measurement and Reporting", 3GPP TSG RAN WG1 #90, R1-1713917, Aug. 25, 2017, (5p).
MediaTek Inc. "Enhancements on multi-TRP/panel transmission", 3GPP TSG RAN WG1 Meeting #95 R1-1812349, Spokane, USA, Nov. 12-16, 2018, (3p).
ZTE, Sanechips. "Details and evaluation results on beam indication", 3GPP TSG RAN WG1 Meeting #91 R1-1719538, Reno, USA, Nov. 27-Dec. 1, 2017, (11p).
CMCC, "Discussion on DL multi-TRP transmission", 3GPP TSG RAN WG1 Meeting #94bis R1-1811048, Chengdu, China, Oct. 8-12, 2018, (3p).
Ericsson, "On DL signalling reduction", 3GPP TSG-RAN WG1 Meeting #95 Tdoc R1-1813608, Spokane, USA, Nov. 12-16, 2018, (3p).
JPOA of the Japanese Patent Application No. 2021-537927, issued on Jul. 7, 2022, (6p).
The Extended European Search Report of Application No. 18944164.5 dated Jul. 7, 2022, (11p).

\* cited by examiner

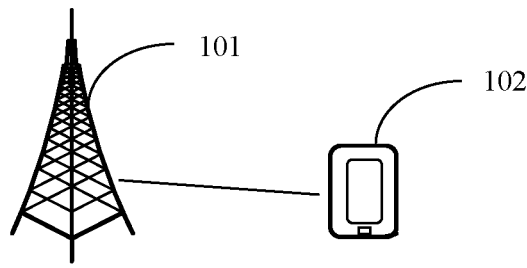

FIG. 1

| The base station generates a signaling indicating at least two receiving beams of user equipment, here, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment | 201 |

| The base station transmits the signaling to the user equipment, such that the user equipment determines, according to the signaling, a respective receiving beam for receiving each of the multiple TBs and receives the TB through the determined respective receiving beam | 202 |

FIG. 2

DATA TRANSMISSION METHOD, BASE STATION, USER EQUIPMENT AND STORAGE MEDIUM

CROSS-REFERENCE TO RELATED APPLICATION

The application is a national stage of International Application No. PCT/CN 2018/123579 filed on Dec. 25, 2018, the disclosure of which is hereby incorporated by reference in its entirety for all purposes.

TECHNICAL FIELD

The present disclosure relates to the field of communication technologies, and more particularly, to a method for data transmission, a base station, user equipment, and a storage medium.

BACKGROUND

In New Radio (NR), in a cast that the communication band is located in Frequency Range (FR) 2, since the path loss of the high frequency communication is relatively large, data transmission based on beam(s) is generally required in order to ensure coverage and resist the path loss. The FR2 refers to a high frequency band greater than 6 GHz. For example, for a beam-based reception process, the base station indicates the Transmission Configuration Indication (TCI) states corresponding to the type D through signaling, so as to inform the user equipment of the receiving beam to be used when receiving. Each TCI state corresponds to a Reference Signal (RS) identifier, and the RS may be either a non-zero power Channel State Information Reference Signal (CSI-RS) or a Synchronization Signal Block (SSB).

In the related art, the base station indicates only one beam direction through signaling. For example, for a reception process of Physical Downlink Shared Channel (PDSCH), different Transport Blocks (TBs) are transmitted by the same panel of the same Transmission Reception Point (TRP), so that the TCI states used by the different TBs are the same. That is, the base station notifies the user equipment to receive these TBs through the same receiving beam.

However, future Multiple-Input Multiple-Output (MIMO) needs to support data transmission based on multiple TRPs or multiple panels. That is, the base station needs to use multiple transmitting beam directions for data transmission, and correspondingly, the user equipment needs to use multiple receiving beams for data reception. Therefore, the signaling for indicating one receiving beam direction in the related art will no longer be suitable for future evolutions. To this end, in the case that such as different TBs are transmitted by different TRPs or different panels, how to design new signaling to enable data transmission between the base station and the user equipment through multiple beams has become an urgent problem to be solved by a person skilled in the art.

SUMMARY

The present disclosure provides a method for data transmission, a base station, user equipment, and a storage medium, which enable data transmission between the base station and the user equipment through multiple beams.

According to a first aspect of the present disclosure, there is provided a method for data transmission. The method may be applied to a base station. The base station may generate a signaling indicating at least two receiving beams of user equipment. The signaling may include Transmission Configuration Indication (TCI) states of a plurality of Transport Blocks (TBs). The plurality of TBs may be transmitted by at least two panels. The at least two panels may be different panels from the same Transmission Reception Point (TRP) or panels from different TRPs. The plurality of TBs may correspond to the at least two receiving beams of the user equipment. The base station may transmit the signaling to the user equipment, such that the user equipment determines a respective receiving beam for receiving each of the plurality TBs according to the signaling and may receive the TB through the determined respective receiving beam.

According to a second aspect of the present disclosure, there is provided a method for data transmission. The method may be applied to user equipment. The user equipment may receive, from a base station, a signaling indicating at least two receiving beams of the user equipment. The signaling may include TCI states of multiple TBs. The multiple TBs may be transmitted by at least two panels. The at least two panels may be different panels from the same TRP or panels from different TRPs. The multiple TBs may correspond to the at least two receiving beams of the user equipment. The user equipment may determine a respective receiving beam for receiving each of the plurality of TBs according to the signaling, and may receive the TB through the determined respective receiving beam.

According to a third aspect of the present disclosure, there is provided an apparatus. The apparatus may include one or more processors, a non-transitory computer-readable memory storing instructions executable by the one or more processors. The one or more processors may be configured to generate a signaling indicating at least two receiving beams of user equipment. The signaling may include TCI states of multiple TBs. The multiple TBs may be transmitted by at least two panel. The at least two panels may be different panels from the same TRP or panels from different TRPs. The multiple TBs may correspond to the at least two receiving beams of the user equipment. The one or more processors may also be configured to transmit the signaling to the user equipment through the transceiver, such that the user equipment determines a respective receiving beam for receiving each of the plurality of TBs according to the signaling and receives the TB through the determined respective receiving beam.

According to a fourth aspect of the present disclosure, there is provided an apparatus. The apparatus may include one or more processors, a non-transitory computer-readable memory storing instructions executable by the one or more processors. The one or more processors may be configured to receive, from a base station through the communication circuit, a signaling indicating at least two receiving beams of a user equipment. The signaling may include TCI states of multiple TBs. The multiple TBs may be transmitted by at least two panels. The at least two panels may be different panels from the same TRP or panels from different TRPs. The multiple TBs may correspond to the at least two receiving beams of the user equipment. The one or more processors may also be configured to determine a respective receiving beam for receiving each of the plurality of TBs according to the signaling and receive the TB through the determined respective receiving beam.

It should be understood that the foregoing general description and the following detailed description are merely exemplary and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a diagram of an implementation environment involved in a method for data transmission according to an exemplary embodiment.

FIG. 2 is a flowchart of a method for data transmission according to an exemplary embodiment.

DETAILED DESCRIPTION

Figure 3:
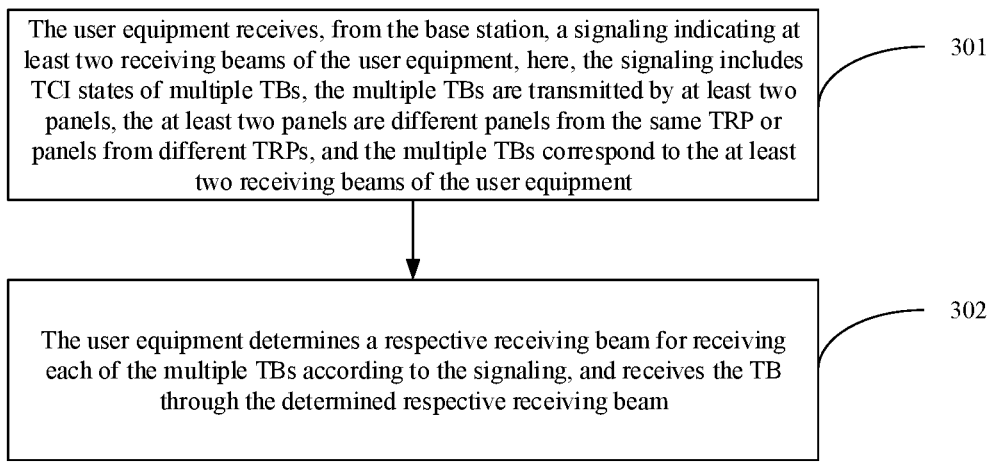
FIG. 3 is a flowchart of a method for data transmission according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with the aspects of the present disclosure as recited in the appended claims.

FIG. 1 is a diagram of an implementation environment involved in a method for data transmission according to an exemplary embodiment. As illustrated in FIG. 1, the implementation environment includes a base station 101 and user equipment 102, and the base station 101 and the user equipment 102 are connected through a communication network.

For the beam-based reception process, the TCI state is used for notifying the user equipment 102 of a receiving beam to be used when receiving the Physical Downlink Control Channel (PDCCH)/PDSCH, and the receiving beam is the same as a receiving beam for receiving a certain SSB or a certain CSI-RS transmitted by the base station. Herein, the base station 101 indicates, through the TCI field in the DCI signaling, the receiving beam to be used when the user equipment 102 receives the TB transmitted in the PDSCH. In the related art, the base station 101 indicates only one receiving beam direction through DCI signaling. Illustratively, for two TBs of one PDSCH, the TCI states corresponding to the two TBs are consistent since the two TBs are transmitted by the same panel of the same TRP. For example, taking the two TBs as TB1 and TB2 respectively, the corresponding DCI signaling can be as follows.

For transport block 1:
Modulation and coding scheme—5 bits
New data indicator—1 bit
Redundancy version—2 bits
For transport block 2:
Modulation and coding scheme—5 bits
New data indicator—1 bit
Redundancy version—2 bits
Transmission configuration indication—0 bit if higher layer parameter tci-PresentInDCI is not enabled; otherwise 3 bits.

As can be seen from the above DCI signaling, TB1 and TB2 correspond to the same TCI state. That is, the base station 101 notifies the user equipment 102 to receive the two TBs through the same receiving beam. Further, in order to clarify how the base station 101 indicates one receiving beam of the user equipment 102, an example of a reception process of PDSCH is described below.

1. The base station 101 generates a RRC signaling, and indicates multiple TCI states through the RRC signaling.

Herein, the number of the multiple TCI states may be up to 64 or up to 128, which is not specifically limited in the embodiment of the present disclosure.

2. The base station 101 generates a MAC signaling, and indicates activation of a part of the TCI states in the RRC signaling through the MAC signaling.

Herein, the number of the part of the TCI states may be 8, and this embodiment of the present disclosure is not specifically limited thereto. In a possible implementation, when the number of TCI states included in the RRC signaling is less than 8, the base station 101 may not need to generate the MAC signaling.

3. The base station 101 generates a DCI signaling, and indicates, through the DCI signaling, one of multiple TCI states activated by the MAC signaling, for use by the user equipment 102 to receive the PDSCH. That is, the base station 101 notifies the user equipment 102 to use one receiving beam to receive all TBs included in the PDSCH.

4. The base station 101 transmits the DCI signaling to the user equipment 102, and the DCI signaling indicates the receiving beam, which used in receiving the RS corresponding to the RS identifier included in the TCI state, used by the user equipment 102 to receive the PDSCH. The details are shown in the Table 1 below.

TABLE 1

| TCI state | RS index | Remarks |
| --- | --- | --- |
| TCI#0 | SSB index#1 | If the base station notifies UE to use |
| TCI#1 | SSB index#2 | the TCI#0, this means that the base |
| TCI#2 | CSI-RS index#5 | station notifies the UE to use the |
| TCI#3 | CSI-RS index#6 | receiving beam used in receiving the |
| . . . | . . . | SSB index#1 to receive the PDSCH. |

The above description is directed to a single receiving beam direction. However, future MIMO needs to support data transmission based on multiple TRPs or multiple panels. That is to say, the base station 101 needs to use multiple transmitting beams for data transmission, and correspondingly, the user equipment 102 needs to use multiple receiving beams for data reception. Therefore, it becomes a problem to be solved in the embodiments of the present disclosure that how to indicate the TCI states. In the following, the data transmission between the base station 101 and the user equipment 102 through multiple beams is explained in detail based on the following embodiments.

FIG. 2 is a flowchart of a method for data transmission according to an exemplary embodiment. As illustrated in FIG. 2, the method is applied to a base station, and includes the following operations.

In 201, the base station generates a signaling indicating at least two receiving beams of user equipment, here, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment.

In 202, the base station transmits the signaling to the user equipment, such that the user equipment determines a receiving beam for receiving each of the multiple TBs according to the signaling and receives the TB through the determined receiving beam.

According to the method provided in the embodiment of the present disclosure, a base station transmits a signaling indicating at least two receiving beams to user equipment during data transmission, here, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment. In such a manner, the user equipment, after receiving the signaling, determines a receiving beam for receiving each of the multiple TBs according to the signaling, and receives the TB through the determined receiving beam. The embodiment of the present disclosure designs new signaling that enables the user equipment to use the multiple receiving beams for data reception when the base station transmits data through the multiple transmitting beam directions. Such a method for data transmission can be suitable for data transmission based on the multiple TRPs or the multiple panels, and make it possible to perform data transmission between the base station and the user equipment through multiple beams.

In a possible implementation, the method further includes the following operations.

The base station generates a RRC signaling indicating a TCI state group, here, multiple TCI states included in the TCI state group are divided into at least two TCI state subgroups, and each of the at least two panels corresponds to a respective one of the TCI state subgroups.

The base station generates a MAC signaling indicating activation of M TCI states in each of the TCI state subgroups.

In a possible implementation, the operation that the base station generates a signaling indicating at least two receiving beams of user equipment includes the following operations.

The base station generates a first DCI signaling including at least two TCI fields.

Herein, the multiple TBs correspond to the at least two TCI fields, and one of the TCI fields is used for indicating TCI states of one or at least two TBs among the multiple TBs.

Herein, the first DCI signaling is used for indicating one TCI state in every M TCI states.

In a possible implementation, the operation that the base station generates a signaling indicating at least two receiving beams of user equipment includes the following operations.

The base station generates a second DCI signaling including one TCI field.

Herein, the multiple TBs correspond to the one TCI field, and a part of bits in the one TCI field are used for indicating TCI states of one or at least two TBs among the multiple TBs.

Herein, the second DCI signaling is used for indicating one TCI state in every M TCI states.

In a possible implementation, the method further includes the following operations.

The base station generating at least two RRC signalings, here, each of the at least two RRC signalings indicates a respective one of TCI state groups, each of the TCI state groups includes multiple TCI states, and each of the at least two panels corresponds to a respective one of the TCI state groups.

The base station generates at least two MAC signalings, here, each of the at least two MAC signalings is used for indicating activation of N TCI states in a respective one of the TCI state groups.

In a possible implementation, the operation that the base station generates a signaling indicating at least two receiving beams of user equipment includes the following operations.

The base station generates a first DCI signaling including at least two TCI fields.

Herein, the multiple TBs correspond to the at least two TCI fields, and one of the TCI fields is used for indicating TCI states of one or at least two TBs among the multiple TBs.

Herein, the first DCI signaling is used for indicating one TCI state in every N TCI states.

In a possible implementation, the operation that the base station generates a signaling indicating at least two receiving beams of user equipment includes the following operations.

The base station generates a second DCI signaling including one TCI field.

Herein, the multiple TBs correspond to the one TCI field, and a part of bits in the one TCI field are used for indicating TCI states of one or at least two TBs among the multiple TBs.

Herein, the second DCI signaling is used for indicating one TCI state in every N TCI states.

Any combination of the above alternative solutions may be used for forming alternative embodiments of the present disclosure, and details are not described herein.

FIG. 3 is a flowchart of a method for data transmission according to an exemplary embodiment. As illustrated in FIG. 3, the method is applied to user equipment, and includes the following operations.

In 301, the user equipment receives, from a base station, a signaling for indicating at least two receiving beams of the user equipment, here, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment.

In 302, the user equipment determines a receiving beam for receiving each of the multiple TBs according to the signaling, and receives the TB through the determined receiving beam.

According to the method provided in the embodiment of the present disclosure, a base station transmits a signaling indicating at least two receiving beams to user equipment during data transmission, here, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment. In such manner, the user equipment, upon reception of the signaling, determines a receiving beam for receiving each of the multiple TBs according to the signaling, and receives the TB through the determined receiving beam. The embodiment of the present disclosure designs new signaling that enables the user equipment to use the multiple receiving beams for data reception when the base station transmits data through the multiple transmitting beam directions. Such a method for data transmission can be suitable for data transmission based on the multiple TRPs or the multiple panels, and make it possible to perform data transmission between the base station and the user equipment through multiple beams.

Figure 4:
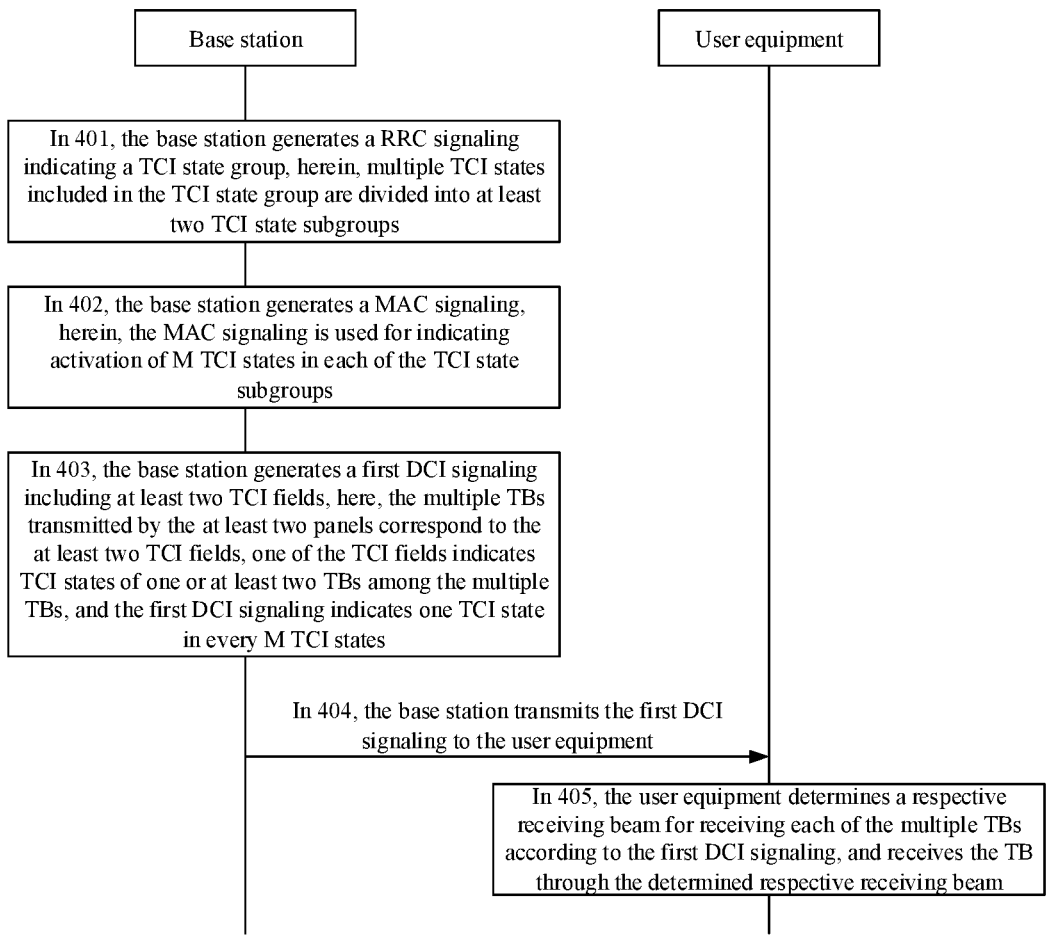
FIG. 4 is a flowchart of a method for data transmission according to an exemplary embodiment.

FIG. 4 is a flowchart of a method for data transmission according to an exemplary embodiment. As illustrated in FIG. 4, the interaction subjects are a base station and user equipment, and the method for data transmission includes the following operations.

In 401, the base station generates a RRC signaling indicating a TCI state group, herein, multiple TCI states included in the TCI state group are divided into at least two TCI state subgroups.

Herein, each of at least two panels for transmitting multiple TBs corresponds to a respective one of the at least two TCI state subgroups. Illustratively, the multiple TBs are transmitted through PDSCH, which is not specifically limited in the embodiment of the present disclosure.

In an embodiment of the present disclosure, the at least two panels are different panels from the same TRP or panels from different TRPs, to enable the base station to transmit data through multiple beam directions. Illustratively, for example, the number of TBs to be transmitted is 3. In a possible implementation, two of the three TBs are transmitted by one panel and the other of the three TBs is transmitted by the other panel; and these two panels for transmitting the three TBs are either different panels from the same TRP, or panels from two TRPs respectively. Herein, the TBs transmitted by the different panels are received by the user equipment through different receiving beams. Therefore, each of the at least two panels corresponds to a respective one of the TCI state subgroups. In another possible implementation, each of the three TBs can also be transmitted by a different panel; and these three panels for transmitting the three TBs are either different panels from the same TRP, or panels from three TRPs respectively.

For this operation, all candidate TCI states corresponding to multiple panels are indicated collectively by a single RRC signaling.

Taking transmitting two TBs as an example. If a RRC signaling indicates 64 TCI states in a case that the base station transmits two TBs through one transmitting beam, the number of TCI states indicated by the RRC signaling may be not less than 64 and not greater than 128 in a case that the base station transmits two TBs through two transmitting beams, so as to form a TCI state group. Herein, in the TCI state group, the first X TCI states correspond to one panel, and form a TCI state subgroup; the next Y TCI states correspond to the other panel, and form the other TCI state subgroup. Correspondingly, the TCI state group may be as follows.

TCI #0
TCI #1
. . .
TCI #X−1
TCI #X
. . .
TCI #X+Y−1

As described above, the X+Y TCI states included in the TCI state group are divided into two TCI state subgroups, where TCI #0 to TCI #X−1 form one TCI state subgroup, and TCI #X to TCI #X+Y−1 form the other TCI state subgroup. Illustratively, assuming that the values of X and Y are both 64, TCI #0 to TCI #63 form one TCI state subgroup corresponding to one panel; TCI #64 to TCI #127 form the other TCI state subgroup corresponding to the other panel.

In 402, the base station generates a MAC signaling, herein, the MAC signaling is used for indicating activation of M TCI states in each of the TCI state subgroups.

For this operation, the activation of the TCI states is indicated collectively by a single MAC signaling.

Here, the value of M is a positive integer. For example, the value of M may be 8, or the value of M may be different for different TCI state subgroups. For example, the value of M is 8 for the TCI state subgroup #1, and the value of M is 6 for the TCI state subgroup #2, which are not specifically limited in the embodiment of the present disclosure.

Continuing with the example of transmitting two TBs, if one transmitting beam is used for data transmission for the transmission process of the PDSCH, and the MAC signaling is used for indicating activation of 8 TCI states among the 64 TCI states indicated by the RRC signaling, then for the case of transmission through two transmitting beams, the MAC signaling can indicate to activate 16 TCI states among X+Y TCI states indicated by the RRC signaling, and the 16 TCI states may not be from the same TCI state subgroup. For example, 8 TCI states among the 16 TCI states are from one TCI state subgroup and the remaining 8 TCI states among the 16 TCI states are from the other TCI state subgroup. Accordingly, the MAC signaling for indicating the activation of the TCI states needs to occupy X+Y bits.

In addition, the MAC CE (Control Element) also needs to indicate a serving cell ID, a BWP (Bandwidth Part) ID, and the like.

In summary, the TCI states activated by indication of the MAC signaling need to be from the respective TCI state subgroups. Illustratively, in a case that two TRPs transmit multiple TBs, if each TRP has only one panel, all the TCI states activated by indication of the MAC signaling cannot correspond to only one TRP, because the DCI signaling transmitted by the base station to the user equipment needs to indicate at least two beam directions and for this case, one TRP corresponds to only one beam direction at the same time. If two TRPs transmit multiple TBs, and each TRP has at least two panels, then all the TCI states activated by indication of the MAC signaling may correspond to one TRP, and correspond to different panels of the one TRP, so that the subsequent DCI signaling can indicate at least two beam directions, and each of the beam directions corresponds to a respective one of the panels.

In 403, the base station generates a first DCI signaling including at least two TCI fields, here, the multiple TBs transmitted by the at least two panels correspond to the at least two TCI fields, one of the TCI fields indicates TCI states of one or at least two TBs among the multiple TBs, and the first DCI signaling indicates one TCI state in every M TCI states.

Herein, the first DCI signaling is also referred to as the signaling indicating at least two receiving beams of the user equipment. As described above, the first DCI signaling includes TCI states of multiple TBs, and all of these TCI states are activated by indication of the MAC signaling.

In the embodiment of the present disclosure, the number of TCI fields included in the DCI signaling is not less than 2 and not greater than the number of TBs transmitted. Illustratively, assuming that three TBs are transmitted, two of the three TBs are transmitted by one panel and the other of the three TBs is transmitted by the other panel, the two TBs transmitted by the one panel correspond to one TCI field and the other TB corresponds to the other TCI field.

Taking each of two TBs corresponding to a respective one of two TCI fields as an example, the first DCI signaling may be as follows.

For transport block 1:
Modulation and coding scheme—5 bits
New data indicator—1 bit
Redundancy version—2 bits
Transmission configuration indication—0 bit if higher layer parameter tci-PresentInDCI is not enabled; otherwise 3 bits.
For transport block 2:
Modulation and coding scheme—5 bits
New data indicator—1 bit
Redundancy version—2 bits
Transmission configuration indication—0 bit if higher layer parameter tci-PresentInDCI is not enabled; otherwise 3 bits.

In 404, the base station transmits the first DCI signaling to the user equipment.

In 405, the user equipment determines a receiving beam for receiving each of the multiple TBs according to the first DCI signaling, and receives the TB through the determined receiving beam.

Herein, the DCI signaling received by the user equipment includes TCI states of multiple TBs, and each TCI state includes an RS identifier (also referred to as RS ID or RS index). The user equipment determines a corresponding RS according to the RS identifier in the TCI state, and then receives the corresponding TB through a receiving beam for receiving the corresponding RS.

In the above process, for example, two panels, such as panel #1 and panel #2, are used to transmit multiple TBs.
1. The RRC signaling gives a TCI state subgroup #1 corresponding to the X candidate TCI states used when the panel #1 transmits the TB(s) and a TCI state subgroup #2 corresponding to the Y candidate TCI states used when the panel #2 transmits the TB(s).
2. The MAC signaling gives the M TCI states activated in the TCI state subgroup #1 and the M TCI states activated in the TCI state subgroup #2. Herein, the low X bits in the MAC signaling are used for activating the M TCI states among the X candidate TCI states in the TCI state subgroup #1, and the high Y bits in the MAC signaling are used for activating the M TCI states among the Y candidate TCI states in the TCI state subgroup #2.
3. The first DCI signaling gives one of the M TCI states activated by the MAC signaling. Herein, the first TCI field in the first DCI signaling is used for indicating one of the M TCI states activated by the low X bits in the MAC signaling, and the second TCI field in the first DCI signaling is used for indicating one of the M TCI states activated by the high Y bits in the MAC signaling.

Thus, the user equipment can obtain, according to the DCI-MAC-RRC signalings, an accurate TCI state of each TB transmitted by the respective panels, thereby obtaining the accurate receiving beams.

Figure 5:
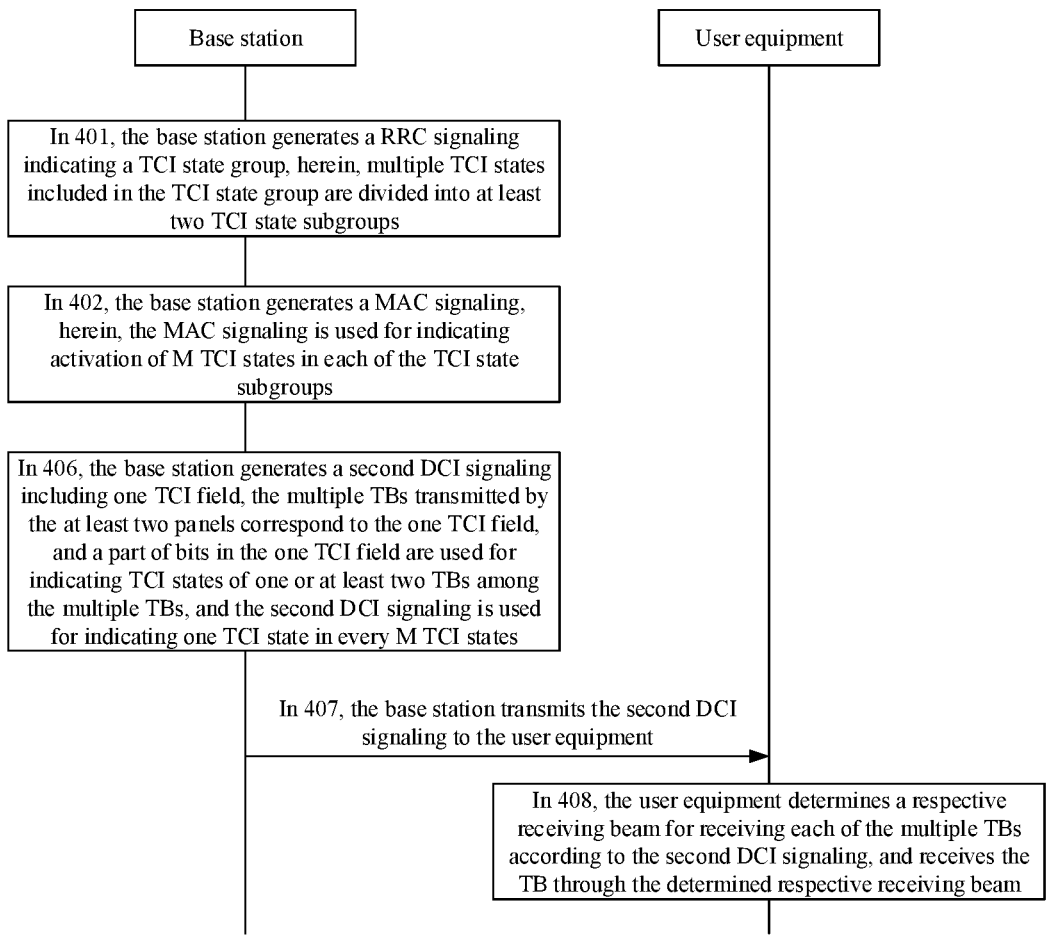
FIG. 5 is a flowchart of a method for data transmission according to an exemplary embodiment.

In a possible implementation, as illustrated in FIG. 5, the above operations 403 to 405 may also be replaced by the following operations 406 to 408.

In 406, the base station generates a second DCI signaling including one TCI field, the multiple TBs transmitted by the at least two panels correspond to the one TCI field, and a part of bits in the one TCI field are used for indicating TCI states of one or at least two TBs among the multiple TBs, and the second DCI signaling is used for indicating one TCI state in every M TCI states.

In operation 403 above, multiple TCI fields are configured in the first DCI signaling, and the TCI states of the multiple TBs are indicated by at least two TCI fields. In a possible implementation, the embodiment of the present disclosure further supports the second DCI signaling to indicate the TCI states of the multiple TBs collectively by one TCI field.

It should be noted that a part of bits in the one TCI field are used for indicating TCI states of one or at least two TBs among the multiple TBs. Illustratively, for example, two TBs are transmitted, one of which may correspond to the first A bits in the one TCI field and the other of which may correspond to the remaining last B bits in the one TCI field. The values of A and B may be the same or different, and this embodiment of the present disclosure is not specifically limited thereto.

In addition, for the case where one TCI field is used, the number of bits in the one TCI field is increased compared to the number of bits in one of the TCI fields in 403.

In 407, the base station transmits the second DCI signaling to the user equipment.

In 408, the user equipment determines a receiving beam for receiving each of the multiple TBs according to the second DCI signaling, and receives the TB through the determined receiving beam.

In the above process, for example, two panels, such as panel #1 and panel #2, are used to transmit multiple TBs:
1. The RRC signaling gives a TCI state subgroup #1 corresponding to the X candidate TCI states used when the panel #1 transmits the TB(s) and a TCI state subgroup #2 corresponding to the Y candidate TCI states used when the panel #2 transmits the TB(s).
2. The MAC signaling gives the M TCI states activated in the TCI state subgroup #1 and the M TCI states activated in the TCI state subgroup #2. Herein, the low X bits in the MAC signaling are used for activating the M TCI states among the X candidate TCI states in the TCI state subgroup #1, and the high Y bits in the MAC signaling are used for activating the M TCI states among the Y candidate TCI states in the TCI state subgroup #2.
3. The second DCI signaling gives one of the M TCI states activated by the MAC signaling. Herein, the low A bits in the TCI field in the second DCI signaling are used for indicating one of the M TCI states activated by the low X bits in the MAC signaling, and the high B bits in the TCI field in the second DCI signaling are used for indicating one of the M TCI states activated by the high Y bits in the MAC signaling.

Thus, the user equipment can obtain, according to the DCI-MAC-RRC signalings, an accurate TCI state of each TB transmitted by the respective panels, thereby obtaining accurate receiving beams.

According to the method provided in the embodiment of the present disclosure, a base station transmits a signaling indicating at least two receiving beams to user equipment during data transmission, here, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment. In such a manner, the user equipment, after receiving the signaling, determines a receiving beam for receiving each of the multiple TBs according to the signaling, and receives the TB through the determined receiving beam. The embodiment of the present disclosure designs new signaling that enables the user equipment to use the multiple receiving beams for data reception when the base station transmits data through the multiple transmitting beam directions. Such a method for data transmission can be suitable for data transmission based on the multiple TRPs or the multiple panels, and make it possible to perform data transmission between the base station and the user equipment through multiple beams.

Figure 6:
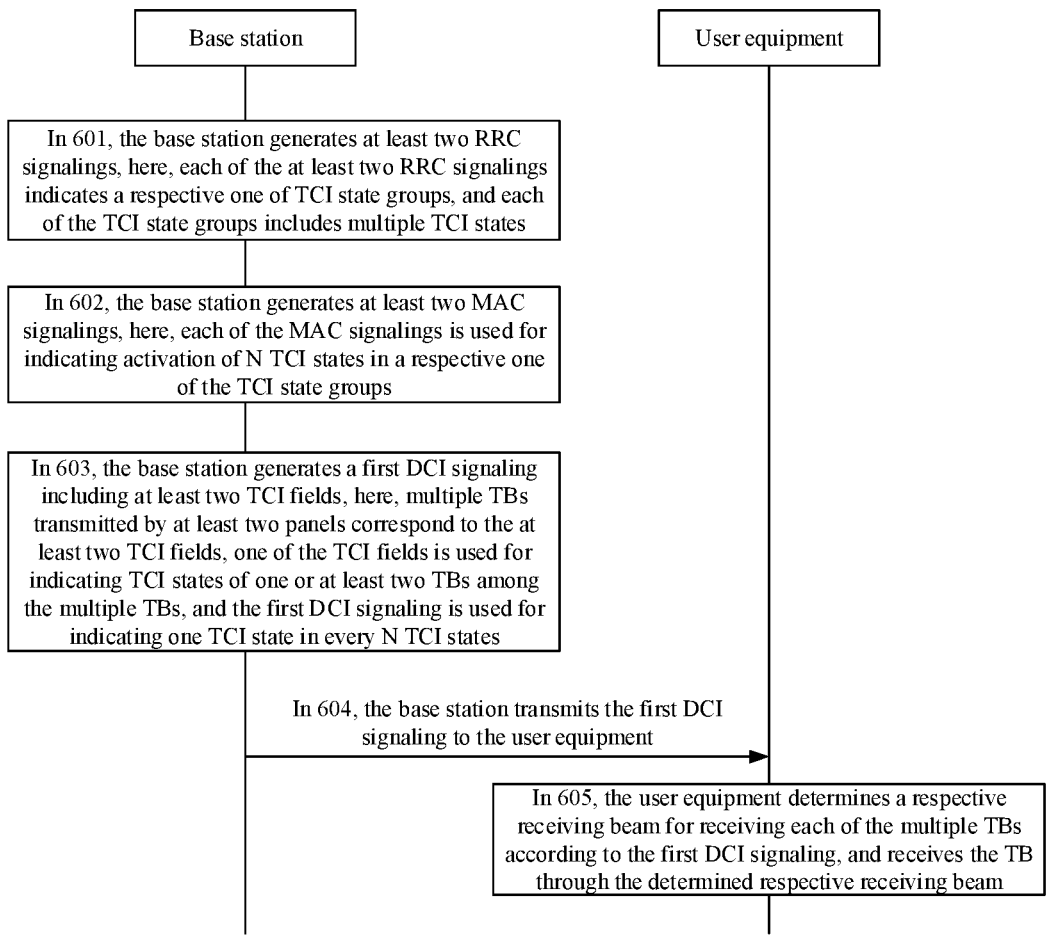
FIG. 6 is a flowchart of a method for data transmission according to an exemplary embodiment.

FIG. 6 is a flowchart of a method for data transmission according to an exemplary embodiment. As illustrated in FIG. 6, the interaction subjects are a base station and user equipment, and the method includes the following operations.

In 601, the base station generates at least two RRC signalings, here, each of the at least two RRC signalings indicates a respective one of TCI state groups, and each of the TCI state groups includes multiple TCI states.

In addition to indicating the TCI state set (i.e., the set of TCI states) by a single RRC signaling in operation 401 above, in one possible implementation, the embodiment of the present disclosure also supports indicating the TCI state set by at least two RRC signalings. Accordingly, each of the at least two panels for transmitting the multiple TBs corresponds to a respective one of the TCI state groups. Illustratively, the multiple TBs may be transmitted by the PDSCH. Herein, the at least two panels are different panels from the same TRP or panels from different TRPs, to enable the base station to transmit data through multiple beam directions.

Herein, the base station transmits the TBs through different panels, and the user equipment also needs to receive the TBs through different receiving beams, so each of the at least two panels corresponds to a respective one of the TCI state groups.

Taking transmitting two TBs as an example. In the case where the two TBs are transmitted through two transmitting beams, two RRC signalings are generated, and each RRC signaling includes a TCI state group. Herein, the TCI state group may be as follows.

A TCI state group 1 included in a RRC signaling:
TCI #0
TCI #1
. . .
TCI #X-1
A TCI state group 2 included in the other RRC signaling:
TCI #0
TCI #1
. . .
TCI #Y-1

As described above, the first TCI state group includes X TCI states and corresponds to one panel, and the second TCI state group includes Y TCI states and corresponds to the other panel. Illustratively, assuming that the values of X and Y are both 64, one TCI state group includes 64 TCI states (i.e., TCI #0 to TCI #63) and corresponds to one panel, and the other TCI state group also includes 64 TCI states (i.e., TCI #0 to TCI #63) and corresponds to the other panel.

It should be noted that the two independent TCI state groups may be transmitted to the user equipment at different times through different RRC signalings, or may be simultaneously transmitted to the user equipment through the same RRC signaling.

In 602, the base station generates at least two MAC signalings, here, each of the MAC signalings is used for indicating activation of N TCI states in a respective one of the TCI state groups.

In the case where at least two RRC signalings are used for indicating the TCI state set, the embodiment of the present disclosure also indicates the activation of the TCI states through at least two MAC signalings.

Herein, the value of N is a positive integer, for example, the value of N is 8. The embodiment of the present disclosure does not specifically limit this. The value of N may also be different for different panels. It should be noted that the values of N and M may be the same or different, and the embodiment of the present disclosure is not specifically limited thereto.

Continuing with the example of transmitting two TBs, if one transmitting beam is used for data transmission for the transmission process of the PDSCH, and the MAC signaling is used for indicating activation of 8 TCI states among the 64 TCI states indicated by the RRC signaling, then for the case of transmission through two transmitting beams, two MAC signalings are needed to indicate the activation of the TCI states. In other words, two MAC signalings are needed for the case of transmission through two transmitting beams, one MAC signaling is used for indicating the activation of 8 TCI states in one of the TCI state groups, which need to occupy the X bits; and the other MAC signaling is used for indicating the activation of 8 TCI states in the other of the TCI state groups, which need to occupy the Y bits.

In addition, each of the two MAC CEs is also required to indicate a serving cell ID, a BWP ID, a TRP ID, and the like, and the embodiment of the present disclosure is not specifically limited thereto.

In summary, TCI states activated by indication of each MAC signaling need to be from the respective one of the TCI state groups.

It should be noted that the two MAC signalings can be transmitted to the user equipment at different times, or may be combined into one MAC signaling and transmitted to the user equipment at the same time.

In 603, the base station generates a first DCI signaling including at least two TCI fields, here, multiple TBs transmitted by at least two panels correspond to the at least two TCI fields, one of the TCI fields is used for indicating TCI states of one or at least two TBs among the multiple TBs, and the first DCI signaling is used for indicating one TCI state in every N TCI states.

The operation in 603 is similar to the operation in 403 described above, and will not be repeated here.

In 604, the base station transmits the first DCI signaling to the user equipment.

In 605, the user equipment determines a receiving beam for receiving each of the multiple TBs according to the first DCI signaling, and receives the TB through the determined receiving beam.

In the above process, for example, two panels, such as panel #1 and panel #2, are used to transmit multiple TBs.
 1. The RRC signaling #1 gives a TCI state group #1, and the RRC signaling #2 gives a TCI state group #2, in which the TCI state group #1 corresponds to X candidate TCI states used when the panel #1 transmits the TB(s), and the TCI state group #2 corresponds to Y candidate TCI states used when the panel #2 transmits the TB(s).
 2. The MAC signaling #1 gives the N TCI states activated in the TCI state group #1, and the MAC signaling #2 gives the N TCI states activated in the TCI state group #2.
 3. The first DCI signaling gives one of the N TCI states activated by the MAC signaling, in which the first TCI field in the first DCI signaling is used for indicating one of the N TCI states activated by the MAC signaling #1; and the second TCI field in the first DCI signaling is used for indicating one of the N TCI states activated by the MAC signaling #2.

Thus, the user equipment can obtain, according to the DCI-MAC-RRC signalings, an accurate TCI state of each TB transmitted by the respective panels, thereby obtaining accurate receiving beams.

Figure 7:
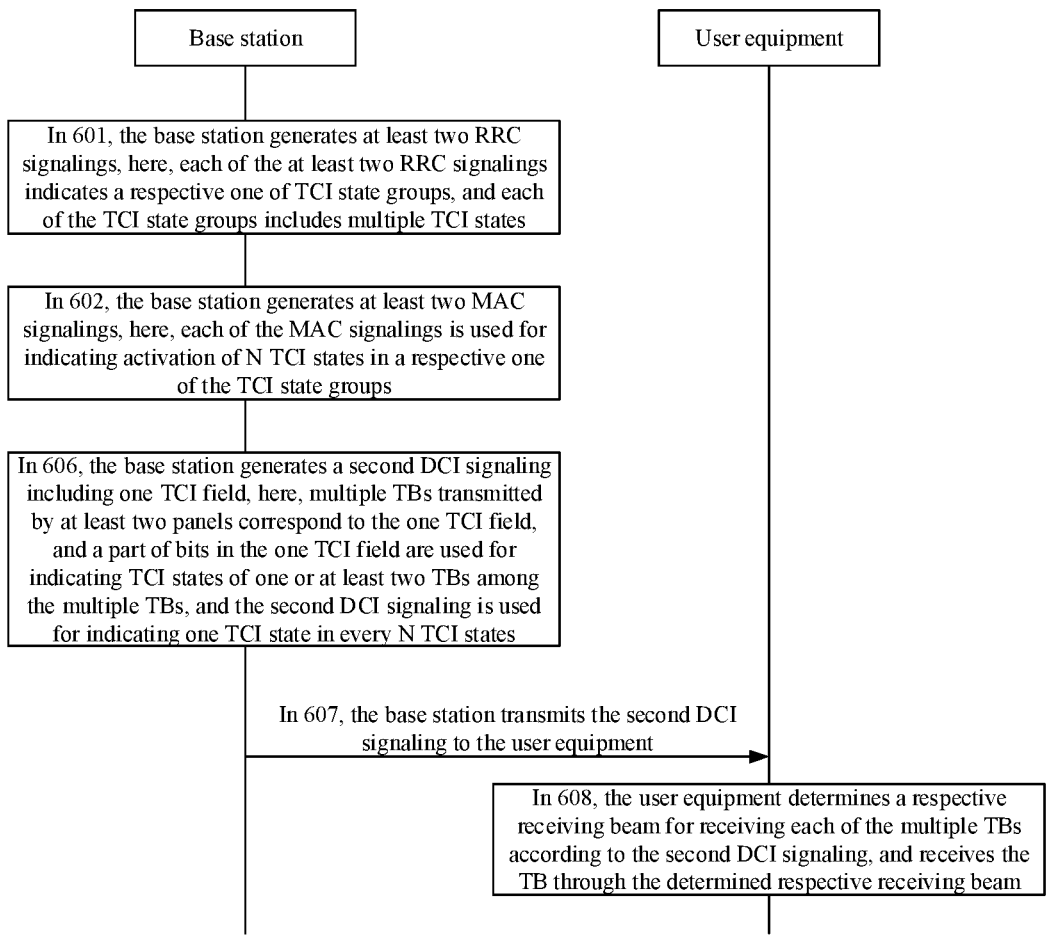
FIG. 7 is a flowchart of a method for data transmission according to an exemplary embodiment.

In a possible implementation, as illustrated in FIG. 7, the operations 603 to 605 described above may also be replaced by operations 606 to 608 below.

In 606, the base station generates a second DCI signaling including one TCI field, here, multiple TBs transmitted by at least two panels correspond to the one TCI field, and a part of bits in the one TCI field are used for indicating TCI states of one or at least two TBs among the multiple TBs, and the second DCI signaling is used for indicating one TCI state in every N TCI states.

The operation in 606 is similar to the operation in 406 described above, and will not be repeated here.

In 607, the base station transmits the second DCI signaling to the user equipment.

In 608, the user equipment determines a receiving beam for receiving each of the multiple TBs according to the second DCI signaling, and receives the TB through the determined receiving beam.

In the above process, for example, two panels, such as panel #1 and panel #2, are used to transmit multiple TBs.
1. The RRC signaling #1 gives a TCI state group #1, and the RRC signaling #2 gives a TCI state group #2, in which the TCI state group #1 corresponds to X candidate TCI states used when the panel #1 transmits the TB(s), and the TCI state group #2 corresponds to Y candidate TCI states used when the panel #2 transmits the TB(s).
2. The MAC signaling #1 gives the N TCI states activated in TCI state group #1, and the MAC signaling #2 gives the N TCI states activated in TCI state group #2.
3. The second DCI signaling gives one of the N TCI states activated by the MAC signaling, in which the low A bits in the TCI field in the second DCI signaling are used for indicating one of the N TCI states activated by the MAC signaling #1, and the high B bits in the TCI field in the second DCI signaling are used for indicating one of the N TCI states activated by the MAC signaling #2.

Thus, the user equipment enables to obtain, according to the DCI-MAC-RRC signalings, an accurate TCI state of each TB transmitted by the respective panels, thereby obtaining accurate receiving beams.

According to the method provided in the embodiment of the present disclosure, a base station transmits a signaling indicating at least two receiving beams to user equipment during data transmission, here, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment, so that the user equipment, after receiving the signaling, determines a receiving beam for receiving each of the multiple TBs according to the signaling, and receives the TB through the determined receiving beam. The embodiment of the present disclosure designs new signaling that enables the user equipment to use the multiple receiving beams for data reception when the base station transmits the data through the multiple transmitting beam directions. Such a method for data transmission can be suitable for data transmission based on the multiple TRPs or the multiple panels, and make it possible to perform data transmission between the base station and the user equipment through multiple beams.

In summary, the data transmission between the base station and the user equipment through the multiple beams is explained in detail in the above two embodiments. That is, by designing signaling indicating multiple beams, the embodiments of the present disclosure make it possible to perform data transmission between the base station and the user equipment through multiple beams. The method for data transmission is capable of supporting data transmission based on multiple TRPs or multiple panels, which is suitable for future evolutions, and improves communication robustness. In detail, the embodiments of the present disclosure implement the following. 1. The base station is capable of scheduling transmission of multiple TBs through one DCI signaling, and the multiple TBs are capable of being transmitted by at least two panels, that is, the multiple TBs can correspond to at least two TCI states, rather than the multiple TBs corresponding to one TCI state. 2. One DCI signaling may jointly indicate TCI states of multiple TBs through one TCI field. 3. One DCI signaling may independently indicate TCI states of multiple TBs through at least two TCI fields, respectively. 4. Multiple TBs can be transmitted by at least two panels, and the at least two panels are different panels from the same TRP or panels from different TRPs, so as to implement multiple beam transmission.

Figure 8:
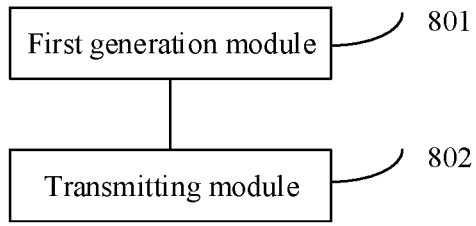
FIG. 8 is a block diagram of an apparatus for data transmission according to an exemplary embodiment.

FIG. 8 is a block diagram of an apparatus for data transmission according to an exemplary embodiment. Referring to FIG. 8, the apparatus includes a first generation module 801 and a transmitting module 802.

The first generation module 801 is configured to generate a signaling indicating at least two receiving beams of user equipment, here, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment.

The transmitting module 802 is configured to transmit the signaling to the user equipment, such that the user equipment determines a receiving beam for receiving each of the multiple TBs according to the signaling, and receives the TB through the determined receiving beam. The receiving beam, for example, may be a respective receiving beam.

The apparatus provided in the embodiment of the present disclosure transmits a signaling indicating at least two receiving beams to user equipment during data transmission, herein, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment, so that the user equipment, after receiving the signaling, determines a receiving beam for receiving each of the multiple TBs according to the signaling, and receives the TB through the determined receiving beam. The embodiment of the present disclosure designs new signaling that enables the user equipment to use the multiple receiving beams for data reception when the base station transmits the data through the multiple transmitting beam directions. The method for data transmission can be suitable for data transmission based on the multiple TRPs or the multiple panels, and make it possible to perform data transmission between the base station and the user equipment through multiple beams.

Figure 9:
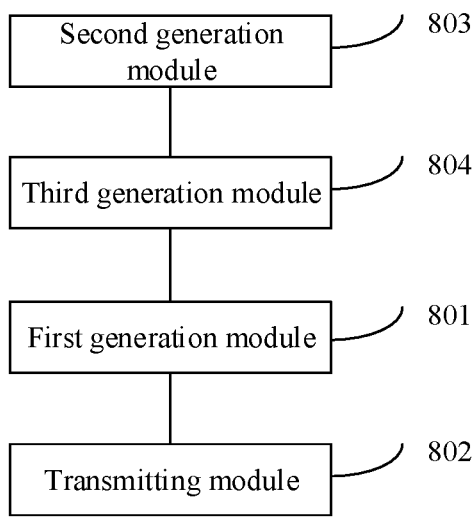
FIG. 9 is a block diagram of an apparatus for data transmission according to an exemplary embodiment.

In a possible implementation, referring to FIG. 9, the apparatus further includes a second generation module 803 and a third generation module 804.

The second generation module 803 is configured to generate a RRC signaling indicating a TCI state group, here, multiple TCI states included in the TCI state group are divided into at least two TCI state subgroups, and each of the at least two panels corresponds to a respective one of the TCI state subgroups.

The third generation module 804 is configured to generate a MAC signaling indicating activation of M TCI states in each of the TCI state subgroups.

In a possible implementation, the first generation module 801 is further configured to generate a first DCI signaling including at least two TCI fields.

Herein, the multiple TBs correspond to the at least two TCI fields, and one of the TCI fields is used for indicating TCI states of one or at least two TBs among the multiple TBs.

Herein, the first DCI signaling is used for indicating one TCI state in every M TCI states.

In a possible implementation, the first generation module 801 is further configured to generate a second DCI signaling including one TCI field.

Herein, the multiple TBs correspond to the one TCI field, and a part of bits in the one TCI field are used for indicating TCI states of one or at least two TBs among the multiple TBs.

Herein, the second DCI signaling is used for indicating one TCI state in every M TCI states.

In a possible implementation, the second generation module 803 is configured to generate at least two RRC signalings, herein, each of the at least two RRC signalings indicates a respective one of TCI state groups, each TCI state group includes multiple TCI states, each of the at least two panels corresponds to a respective one of the TCI state groups.

The third generation module 804 is configured to generate at least two MAC signalings, herein, each of the MAC signalings is used for indicating activation of N TCI states in a respective one of the TCI state groups.

In a possible implementation, the first generation module 801 is further configured to generate a first DCI signaling including at least two TCI fields.

Herein, the multiple TBs correspond to the at least two TCI fields, and one of the TCI fields is used for indicating TCI states of one or at least two TBs among the multiple TBs.

The first DCI signaling is used for indicating one TCI state in every N TCI states.

In a possible implementation, the first generation module 801 is further configured to generate a second DCI signaling including one TCI field.

Herein, the multiple TBs correspond to the one TCI field, and a part of bits in the one TCI field are used for indicating TCI states of one or at least two TBs among the multiple TBs.

Herein, the second DCI signaling is used for indicating one TCI state in every N TCI states.

Any combination of the above alternative solutions may be used for forming alternative embodiments of the present disclosure, which will not be described here.

Figure 10:
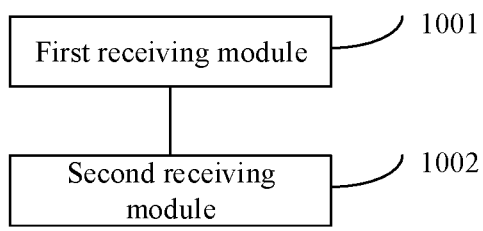
FIG. 10 is a block diagram of an apparatus for data transmission according to an exemplary embodiment.

FIG. 10 is a block diagram of an apparatus for data transmission according to an exemplary embodiment. Referring to FIG. 10, the apparatus includes a first receiving module 1001 and a second receiving module 1002.

The first receiving module 1001 is configured to receive, from a base station, a signaling indicating at least two receiving beams of user equipment, herein, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment.

The second receiving module 1002 is configured to determine a receiving beam for receiving each of the multiple TBs according to the signaling and to receive the TB through the determined receiving beam.

The apparatus provided in the embodiment of the present disclosure transmits a signaling indicating at least two receiving beams to user equipment during data transmission, herein, the signaling includes TCI states of multiple TBs, and the multiple TBs are transmitted by at least two panels, the at least two panels are different panels from the same TRP or panels from different TRPs, and the multiple TBs correspond to the at least two receiving beams of the user equipment, so that the user equipment, after receiving the signaling, determines a receiving beam for receiving each of the multiple TBs according to the signaling, and receives the TB through the determined receiving beam. The embodiment of the present disclosure designs new signaling that enables the user equipment to use the multiple receiving beams for data reception when the base station transmits data through the multiple transmitting beam directions. The method for data transmission can be suitable for data transmission based on the multiple TRPs or the multiple panels, and make it possible to perform data transmission between the base station and the user equipment through multiple beams.

With respect to the apparatus in the above-described embodiments, the specific manners in which the various modules perform the operations have been described in detail in the embodiments related to the methods, and will not be described in detail here.

Figure 11:
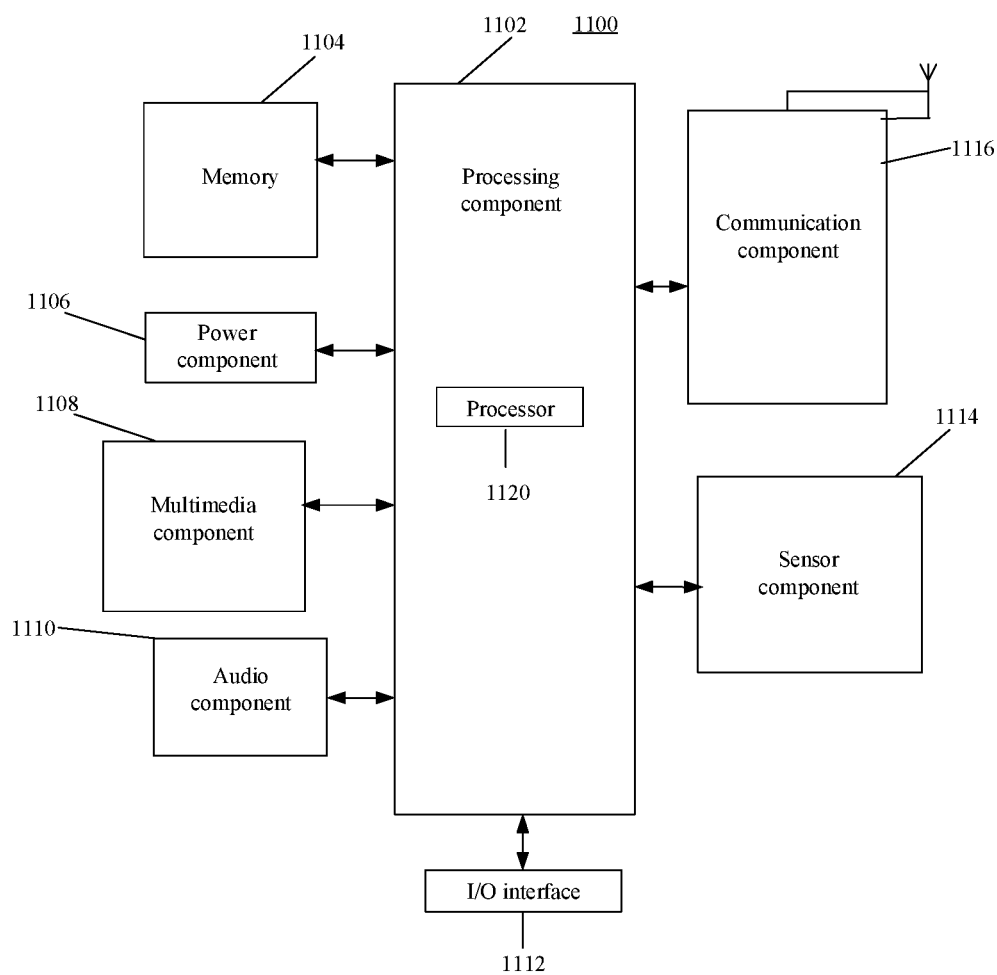
FIG. 11 is a block diagram of user equipment according to an exemplary embodiment.

FIG. 11 is a block diagram of user equipment according to an exemplary embodiment. For instance, the user equipment 1100 may be a mobile phone, a computer, a digital broadcast terminal, a messaging device, a game console, a tablet device, a medical device, a fitness device, a personal digital assistant, or the like.

Referring to FIG. 11, the user equipment 1100 may include one or more of following components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls the overall operations of apparatus 1100, such as operations associated with display, telephone calls, data communications, camera operations, and recording operations. The processing component 1102 may include one or more processors 1120 to execute instructions to perform all or part of the operations in the abovementioned methods. Moreover, the processing component 1102 may include one or more modules which facilitate interaction between the processing component 1102 and other components. For instance, the processing component 1102 may include a multimedia module to facilitate interaction between the multimedia component 1108 and the processing component 1102.

The memory 1104 is configured to store various types of data to support operation of the user equipment 1100. Examples of such data include instructions for any application or method operating on the user equipment 1100, contact data, phone book data, messages, pictures, video, etc. The memory 1104 may be implemented by any type of volatile or non-volatile storage device, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 provides power for various components of the user equipment 1100. The power component 1106 may include a power management system, one or more power supplies, and other components associated with generation, management, and distribution of the power for the user equipment 1100.

The multimedia component 1108 includes a screen providing an output interface between the user equipment 1100 and a user. In some embodiments, the screen may include Liquid Crystal Display (LCD) and a Touch Panel (TP). If the screen includes the TP, the screen may be implemented as a touch screen to receive an input signal from the user. The TP includes one or more touch sensors to sense touches, swipes, and gestures on the TP. The touch sensors may not only sense a boundary of a touch or swipe action, but also detect a duration and pressure associated with the touch or swipe action. In some embodiments, the multimedia component 1108 includes a front camera and/or a rear camera. The front camera and/or the rear camera may receive external multimedia data when the user equipment 1100 is in an operating mode, such as a photographing mode or a video mode. Each of the front camera and the rear camera may be a fixed optical lens system or have focusing and optical zooming capabilities.

The audio component 1110 is configured to output and/or input audio signals. For instance, the audio component 1110 includes a Microphone (MIC), and the MIC is configured to receive an external audio signal when the user equipment 1100 is in the operation mode, such as a call mode, a recording mode and a voice recognition mode. The received audio signal may further be stored in the memory 1104 or sent through the communication component 1116. In some embodiments, the audio component 1110 further includes a speaker configured to output the audio signal. The communication component 1116, for example, may be a communication circuit.

The I/O interface 1112 provides an interface between the processing component 1102 and a peripheral interface module, and the peripheral interface module may be a keyboard, a click wheel, a button and the like. The button may include, but not limited to, a home button, a volume button, a starting button, and a locking button.

The sensor component 1114 includes one or more sensors configured to provide status assessment in various aspects for the user equipment 1100. For instance, the sensor component 1114 may detect the on/off state of the user equipment 1100, relative positioning of components, such as a display and a small keyboard of the user equipment 1100. The sensor component 1114 may further detect a change in a position of the user equipment 1100 or a component of the user equipment 1100, presence or absence of contact between user and the user equipment 1100, orientation or acceleration/deceleration of the user equipment 1100, and a change in the temperature of the user equipment 1100. The sensor component 1114 may include a proximity sensor configured to detect presence of an object nearby without any physical contact. The sensor component 1114 may also include a photosensor, such as a Complementary Metal Oxide Semiconductor (CMOS) or Charge Coupled Device (CCD) image sensor, configured for use in an imaging application. The sensor component 1114 may also include an acceleration sensor, a gyroscope sensor, a magnetic sensor, a pressure sensor, or a temperature sensor.

Communication component 1116 is configured to facilitate wired or wireless communication between the user equipment 1100 and other device. The user equipment 1100 may access a communication-standard-based wireless network, such as a Wi-Fi network, a 2nd-Generation (2G) or 3rd-Generation (3G) network or a combination thereof. In an exemplary embodiment, the communication component 1116 receives broadcast signal or broadcast associated information from an external broadcast management system through a broadcast channel. In an exemplary embodiment, the communication component 1116 further includes a Near Field Communication (NFC) module to facilitate short-range communication.

In an exemplary embodiment, the user equipment 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the abovementioned methods.

In an exemplary embodiment, there is also provided a non-transitory computer-readable storage medium including an instruction, such as the memory 1104 including an instruction, and the instruction may be executed by the processor 1120 of the user equipment 1100 to implement the abovementioned methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

There is also provided a non-transitory computer-readable storage medium, having stored thereon instructions that, when executed by a processor of user equipment, cause the user equipment to perform the abovementioned methods for data transmission.

Figure 12:
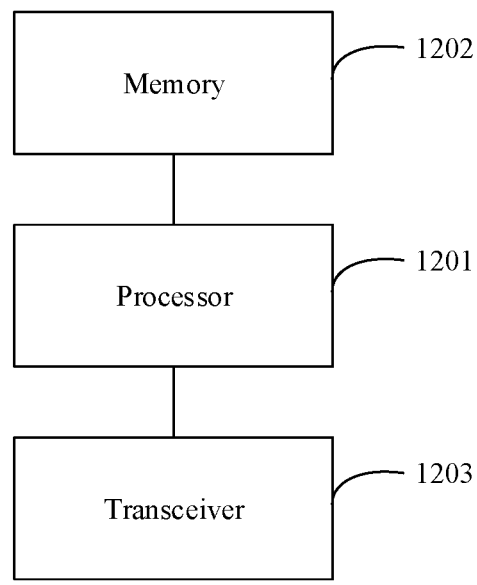
FIG. 12 is a block diagram of a base station according to an exemplary embodiment.

FIG. 12 is a block diagram of a base station according to an exemplary embodiment. Referring to FIG. 12, the base station includes a processor 1201, a memory 1202 for storing instructions executable by the processor, and a transceiver 1203. Herein, the processor 1201 is configured to execute the following instructions.

A signaling indicating at least two receiving beams of user equipment is generated, herein, the signaling includes TCI states of multiple TBs, the multiple TBs are transmitted by at least two panels, the at least two panels are different panels from the same TRP or panels from different TRPs, and the multiple TBs correspond to the at least two receiving beams of the user equipment.

The signaling is transmitted to the user equipment, such that the user equipment determines, according to the signaling, a receiving beam for receiving each of the multiple TBs and receives the TB through the determined receiving beam.

There is also provided a computer-readable storage medium, having stored thereon instructions that, executed by a processor of a base station, cause the base station to perform the abovementioned methods for data transmission.

Other implementation solutions of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for data transmission, the method comprising:
   generating, by a base station, a signaling indicating at least two receiving beams of user equipment, wherein the signaling comprises Transmission Configuration Indication (TCI) states of a plurality of Transport Blocks (TBs), the plurality of TBs are transmitted by at least two panels, the at least two panels are different panels from a same Transmission Reception Point (TRP) or panels from different TRPs, and the plurality of TBs correspond to the at least two receiving beams of the user equipment; and
   transmitting, by the base station, the signaling to the user equipment, such that the user equipment determines a respective receiving beam for receiving each of the plurality of TBs according to the signaling and receives the TB through the determined respective receiving beam.

2. The method of claim 1, further comprising:
   generating, by the base station, a Radio Resource Control (RRC) signaling, wherein the RRC signaling indicates a TCI state group, a plurality of TCI states comprised in the TCI state group are divided into at least two TCI state subgroups, and each of the at least two panels corresponds to a respective one of the TCI state subgroups; and
   generating, by the base station, a Medium Access Control (MAC) signaling, wherein the MAC signaling indicates activation of M TCI states in each of the TCI state subgroups.

3. The method of claim 2, wherein generating, by the base station, the signaling indicating the at least two receiving beams of the user equipment comprises:
   generating, by the base station, a first Downlink Control Information (DCI) signaling that comprises at least two TCI fields;
   wherein the plurality of TBs correspond to the at least two TCI fields, and one of the TCI fields indicates TCI states of one or at least two TBs among the plurality of TBs; and
   wherein the first DCI signaling indicates one TCI state in every M TCI states.

4. The method of claim 2, wherein generating, by the base station, the signaling indicating the at least two receiving beams of the user equipment comprises:
   generating, by the base station, a second Downlink Control Information (DCI) signaling that comprises one TCI field;
   wherein the plurality of TBs correspond to the one TCI field, and a part of bits in the one TCI field indicate TCI states of one or at least two TBs among the plurality of TBs; and
   wherein the second DCI signaling indicates one TCI state in every M TCI states.

5. The method of claim 1, further comprising:
   generating, by the base station, at least two Radio Resource Control (RRC) signalings, wherein each of the at least two RRC signalings indicates a respective one of TCI state groups, each of the TCI state groups comprises a plurality of TCI states, and each of the at least two panels corresponds to a respective one of the TCI state groups; and
   generating, by the base station, at least two Medium Access Control (MAC) signalings, wherein each of the at least two MAC signalings indicates activation of N TCI states in a respective one of the TCI state groups.

6. The method of claim 5, wherein generating, by the base station, the signaling indicating the at least two receiving beams of the user equipment comprises:
   generating, by the base station, a first Downlink Control Information (DCI) signaling that comprises at least two TCI fields;
   wherein the plurality of TBs correspond to the at least two TCI fields, and one of the TCI fields indicates TCI states of one or at least two TBs among the plurality of TBs; and
   wherein the first DCI signaling indicates one TCI state in every N TCI states.

7. The method of claim 5, wherein generating, by the base station, the signaling indicating the at least two receiving beams of the user equipment comprises:
   generating, by the base station, a second Downlink Control Information (DCI) signaling that comprises one TCI field;
   wherein the plurality of TBs correspond to the one TCI field, and a part of bits in the one TCI field indicate TCI states of one or at least two TBs among the plurality of TBs; and
   wherein the second DCI signaling indicates one TCI state in every N TCI states.

8. A method for data transmission, the method comprising:
   receiving, by a user equipment, from a base station, a signaling indicating at least two receiving beams of the user equipment, wherein the signaling comprises Transmission Configuration Indication (TCI) states of a plurality of Transport Blocks (TBs), the plurality of TBs are transmitted by at least two panels, the at least two panels are different panels from a same Transmission Reception Point (TRP) or panels from different TRPs, and the plurality of TBs correspond to the at least two receiving beams of the user equipment; and
   determining, by the user equipment, a respective receiving beam for receiving each of the plurality of TBs according to the signaling, and receiving the TB through the determined respective receiving beam.

9. An apparatus comprising:
   one or more processors;
   a transceiver; and
   a non-transitory computer-readable storage medium storing instructions executable by the one or more processors, wherein the one or more processors are configured to:
   generate a signaling indicating at least two receiving beams of a user equipment, wherein the signaling comprises Transmission Configuration Indication (TCI) states of a plurality of Transport Blocks (TBs), the plurality of TBs are transmitted by at least two panels, the at least two panels are different panels from a same Transmission Reception Point (TRP) or panels from different TRPs, and the plurality of TBs correspond to the at least two receiving beams of the user equipment; and transmit the signaling to the user equipment through the transceiver, such that the user equipment determines a respective receiving beam for receiving each of the plurality of TBs according to the signaling and receives the TB through the determined respective receiving beam.

10. The apparatus of claim 9, wherein the one or more processors are further configured to:

generate a Radio Resource Control (RRC) signaling, wherein the RRC signaling indicates a TCI state group, a plurality of TCI states comprised in the TCI state group are divided into at least two TCI state subgroups, and each of the at least two panels corresponds to a respective one of the TCI state subgroups; and generate a Medium Access Control (MAC) signaling, wherein the MAC signaling indicates activation of M TCI states in each of the TCI state subgroups.

11. The apparatus of claim 10, wherein the one or more processors are further configured to:

generate a first Downlink Control Information (DCI) signaling that comprises at least two TCI fields;

wherein the plurality of TBs correspond to the at least two TCI fields, and one of the TCI fields indicates TCI states of one or at least two TBs among the plurality of TBs; and wherein the first DCI signaling indicates one TCI state in every M TCI states.

12. The apparatus of claim 10, wherein the one or more processors are further configured to:

generate a second Downlink Control Information (DCI) signaling that comprises one TCI field;

wherein the plurality of TBs correspond to the one TCI field, and a part of bits in the one TCI field indicate TCI stated of one or at least two TBs among the plurality of TBs; and wherein the second DCI signaling indicates one TCI state in every M TCI states.

13. The apparatus of claim 9, wherein the one or more processors are further configured to:

generate at least two Radio Resource Control (RRC) signalings, wherein each of the at least two RRC signalings indicates a respective one of TCI state groups, each of the TCI state groups comprises a plurality of TCI states, and each of the at least two panels corresponds to a respective one of the TCI state groups; and generate at least two Medium Access Control (MAC) signalings, wherein each of the at least two MAC signalings indicates activation of N TCI states in a respective one of the TCI state groups.

14. The apparatus of claim 13, wherein the one or more processors are further configured to:

generate a first Downlink Control Information (DCI) signaling that comprises at least two TCI fields;

wherein the plurality of TBs correspond to the at least two TCI fields, and one of the TCI fields indicates TCI states of one or at least two TBs among the plurality of TBs; and wherein the first DCI signaling indicates one TCI state in every N TCI states.

15. The apparatus of claim 13, wherein the one or more processors are further configured to:

generate a second Downlink Control Information (DCI) signaling that comprises one TCI field;

wherein the plurality of TBs correspond to the one TCI field, and a part of bits in the one TCI field indicate TCI states of one or at least two TBs among the plurality of TBs; and wherein the second DCI signaling indicates one TCI state in every N TCI states.

16. An apparatus, comprising:

one or more processors;

a communication component; and a non-transitory computer-readable storage medium storing instructions executable by the one or more processors, wherein the one or more processors are configured to:

receive, from a base station through the communication circuit, a signaling indicating at least two receiving beams of a user equipment, wherein the signaling comprises Transmission Configuration Indication (TCI) states of a plurality of Transport Blocks (TBs), the plurality of TBs are transmitted by at least two panels, the at least two panels are different panels from a same Transmission Reception Point (TRP) or panels from different TRPs, and the plurality of TBs correspond to the at least two receiving beams of the user equipment; and determine a respective receiving beam for receiving each of the plurality of TBs according to the signaling and to receive the TB through the determined respective receiving beam.

17. A non-transitory computer-readable storage medium, having stored thereon at least one instruction that, when loaded and executed by one or more processors of a base station, causes the one or more processors to perform the method for data transmission according to claim 1.

18. A non-transitory computer-readable storage medium, having stored thereon at least one instruction that, when loaded and executed by one or more processors of a user equipment, causes the one or more processors to perform the method for data transmission according to claim 8.

* * * * *